(12) United States Patent
Bagnasco et al.

(10) Patent No.: US 11,649,780 B1
(45) Date of Patent: May 16, 2023

(54) SYSTEM AND METHOD FOR EXHAUST GAS SENSOR MONITORING

(71) Applicant: Ford Global Technologies, LLC, Dearborn, MI (US)

(72) Inventors: Andrew Bagnasco, Plymouth, MI (US); Jose Francisco Martinez Leyva, Mexico City (MX); Tyler DeWine, Ann Arbor, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/806,644

(22) Filed: Jun. 13, 2022

(51) Int. Cl.
| | | |
|---|---|---|
| *F02D 41/14* | (2006.01) | |
| *G01M 15/10* | (2006.01) | |
| *F02D 41/40* | (2006.01) | |
| *F02D 41/00* | (2006.01) | |
| *F02D 41/22* | (2006.01) | |

(52) U.S. Cl.
CPC ..... *F02D 41/1495* (2013.01); *F02D 41/0087* (2013.01); *F02D 41/1454* (2013.01); *F02D 41/401* (2013.01); *G01M 15/104* (2013.01); *F02D 2041/228* (2013.01); *F02D 2200/101* (2013.01)

(58) Field of Classification Search
CPC ............ F02D 41/1495; F02D 41/0087; F02D 41/1454; F02D 41/401; F02D 2041/228; F02D 2200/101; G01M 15/104
USPC ................ 123/481, 688, 690; 701/107, 109; 73/114.71, 114.72, 114.73
See application file for complete search history.

(56) References Cited

U.S. PATENT DOCUMENTS

| | | | |
|---|---|---|---|
| 6,739,177 | B2 | 5/2004 | Sato et al. |
| 7,574,905 | B2 | 8/2009 | Toya |
| 7,900,616 | B2 | 3/2011 | Saunders |
| 8,145,409 | B2 | 3/2012 | Kerns et al. |
| 8,290,688 | B2 | 10/2012 | Watson |
| 8,924,130 | B2 | 12/2014 | Uhrich et al. |
| 9,382,865 | B2 | 7/2016 | Genslak et al. |
| 9,500,151 | B2 | 11/2016 | Jammoussi et al. |
| 2005/0016253 | A1 | 1/2005 | Anilovich et al. |
| 2013/0180509 | A1 | 7/2013 | Makki et al. |
| 2013/0180510 | A1* | 7/2013 | Makki ................ F02D 41/1495 702/182 |
| 2013/0231844 | A1 | 9/2013 | Uhrich et al. |
| 2014/0007644 | A1 | 1/2014 | Fey |
| 2015/0219033 | A1 | 8/2015 | Jammoussi et al. |
| 2018/0023499 | A1 | 1/2018 | Shibata |
| 2019/0136780 | A1 | 5/2019 | Jammoussi et al. |
| 2020/0004909 | A1 | 1/2020 | Emond et al. |

OTHER PUBLICATIONS

Leyva, J. et al., "System and Method for Diagnosing an Exhaust Gas Sensor," U.S. Appl. No. 17/809,233, filed Jun. 27, 2022, 46 pages.

* cited by examiner

*Primary Examiner* — Hai H Huynh
(74) *Attorney, Agent, or Firm* — Vincent Mastrogiacomo; McCoy Russell LLP (57) ABSTRACT

A method and system for monitoring an exhaust gas sensor coupled in an engine exhaust is provided. In one example, the method adjusts an estimate of an exhaust gas oxygen sensor delay time based on a fuel injection ramping time. The fuel injection ramping time compensates for fuel that is injected to the engine while the engine enters or exits a fuel cut-off mode.

20 Claims, 6 Drawing Sheets

SYSTEM AND METHOD FOR EXHAUST GAS SENSOR MONITORING

FIELD

The present disclosure relates to monitoring an exhaust gas sensor in a motor vehicle.

BACKGROUND AND SUMMARY

An exhaust gas sensor may be positioned in an exhaust system of a vehicle to detect an air/fuel ratio of exhaust gas exhausted from an internal combustion engine of the vehicle. The exhaust gas sensor readings may be applied to provide closed-loop control of engine air-fuel ratio. The closed-loop air-fuel control operates to remove steady-state air-fuel errors and to correct transient air-fuel errors that may result from system changes and/or mapping errors.

Degradation of an exhaust gas sensor may cause engine control degradation that may result in increased emissions and/or reduced vehicle drivability. In addition, regulatory requirements may require the detection of six specific types of degradation. Therefore, it may be desirable to provide accurate determination of exhaust gas sensor degradation. The six behavior types that have regulatory requirements is some regions of the world may be categorized as asymmetric type degradation (e.g., rich-to-lean asymmetric delay, lean-to-rich asymmetric delay, rich-to-lean asymmetric slow response, lean-to-rich asymmetric slow response) that affects only lean-to-rich or rich-to-lean exhaust gas sensor response rates, or symmetric type degradation (e.g., symmetric delay, symmetric slow response) that affects both lean-to-rich and rich-to-lean exhaust gas sensor response rates. The delay type degradation behaviors may be associated with the initial reaction of the exhaust gas sensor to a change in exhaust gas composition and the slow response type degradation behaviors may be associated with a duration after an initial exhaust gas sensor response to transition from a rich-to-lean or lean-to-rich exhaust gas sensor output.

Previous approaches to monitoring exhaust gas sensor degradation, particularly identifying one or more of the six degradation behaviors, have been complex and have generated delay estimates that are less consistent than may be desired. Consequently, indications of sensor degradation may not be as accurate as may be desired.

The inventors herein have recognized the above issues and have overcome at least some of the issues via a method of monitoring an exhaust gas sensor coupled in an engine exhaust, comprising: indicating exhaust gas sensor degradation via a controller according to a time delay estimate, the time delay estimate based on a delay timer value, a nominal time delay, and an injection ramping time.

By indicating exhaust sensor degradation according to a time delay estimate that is based on a delay timer value, a nominal time delay, and an injection ramping time it may be possible to provide the technical result of improving an estimate of an exhaust gas sensor delay time. In particular, basing the time delay estimate on the injection ramping time allows the time delay estimate to be compensated for the amount of time it takes to inject all fuel that has been scheduled to be injected. Thus, if four cylinders have been scheduled to receive fuel after a fuel cut-off mode has been requested, the time delay estimate is compensated for the amount of time that it takes to inject the scheduled fuel. This additional compensation may improve the time delay estimate because it compensates for the amount of time it takes to actually stop injecting fuel to the engine.

The present method and system may provide the advantage of improving an oxygen sensor delay time estimate. By improving the oxygen sensor delay time estimate, it may be possible to improve engine air-fuel ratio control. In addition, the system and method described herein may simplify methods for estimating an oxygen sensor delay time. Further, the system and method described herein may help to reduce an amount of time it takes to calibrate an engine control system.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
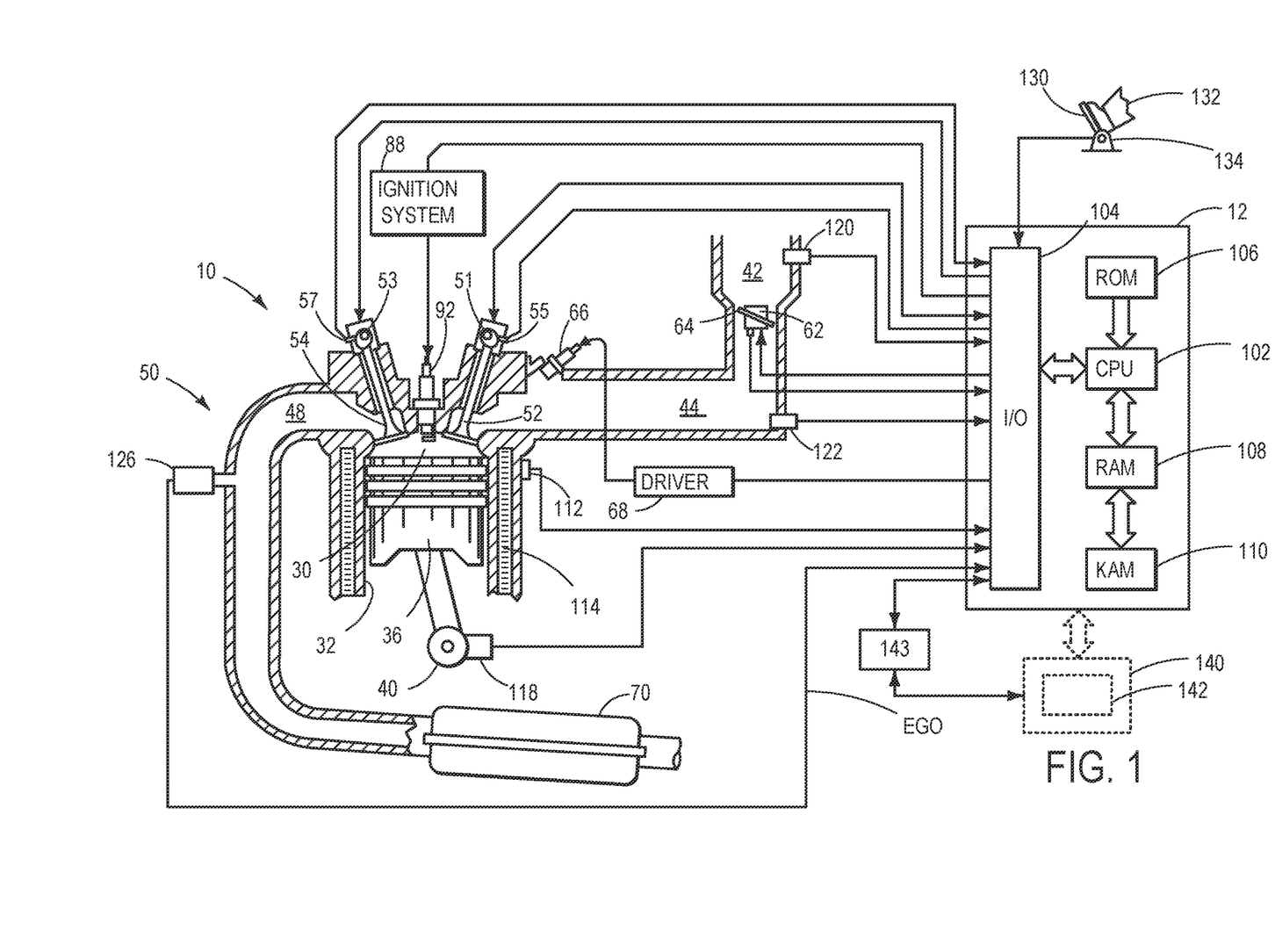
FIG. 1 shows a schematic diagram of an embodiment of a propulsion system of a vehicle including an exhaust gas sensor.
Figure 8:
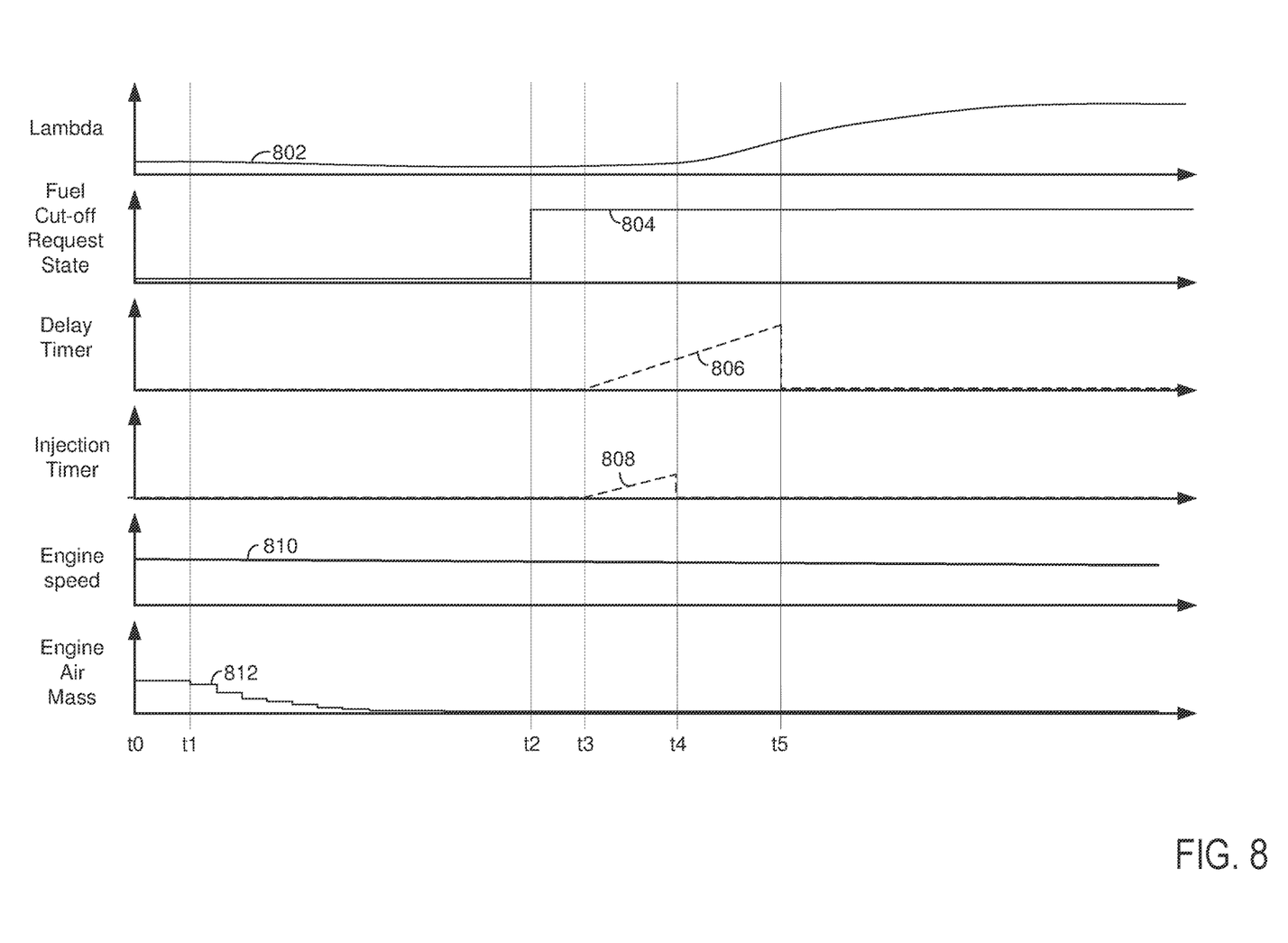
FIGS. 8 and 9 show plots illustrating two methods for determining a time delay of exhaust gas sensor.
Figure 9:
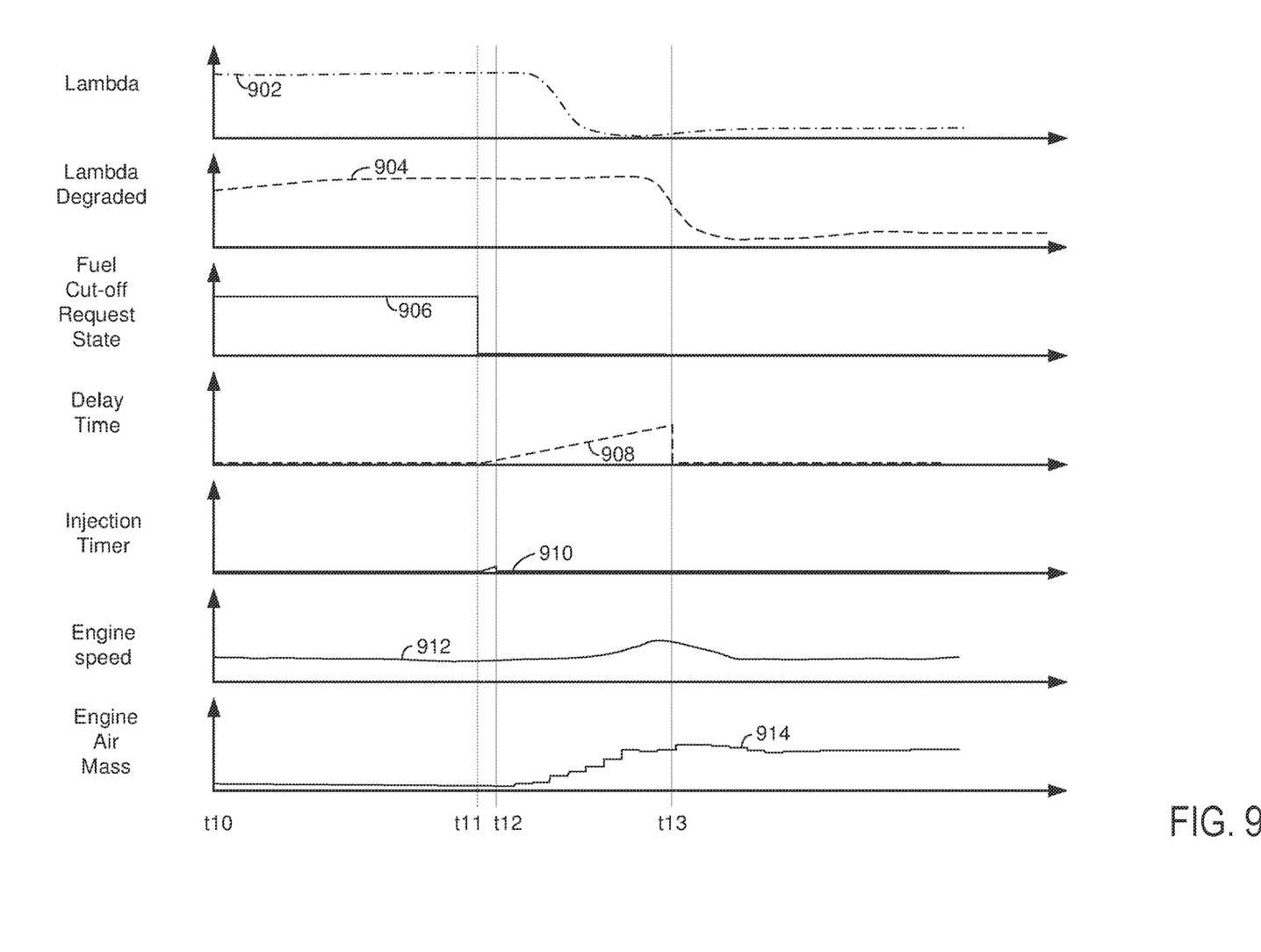
Figure 10:
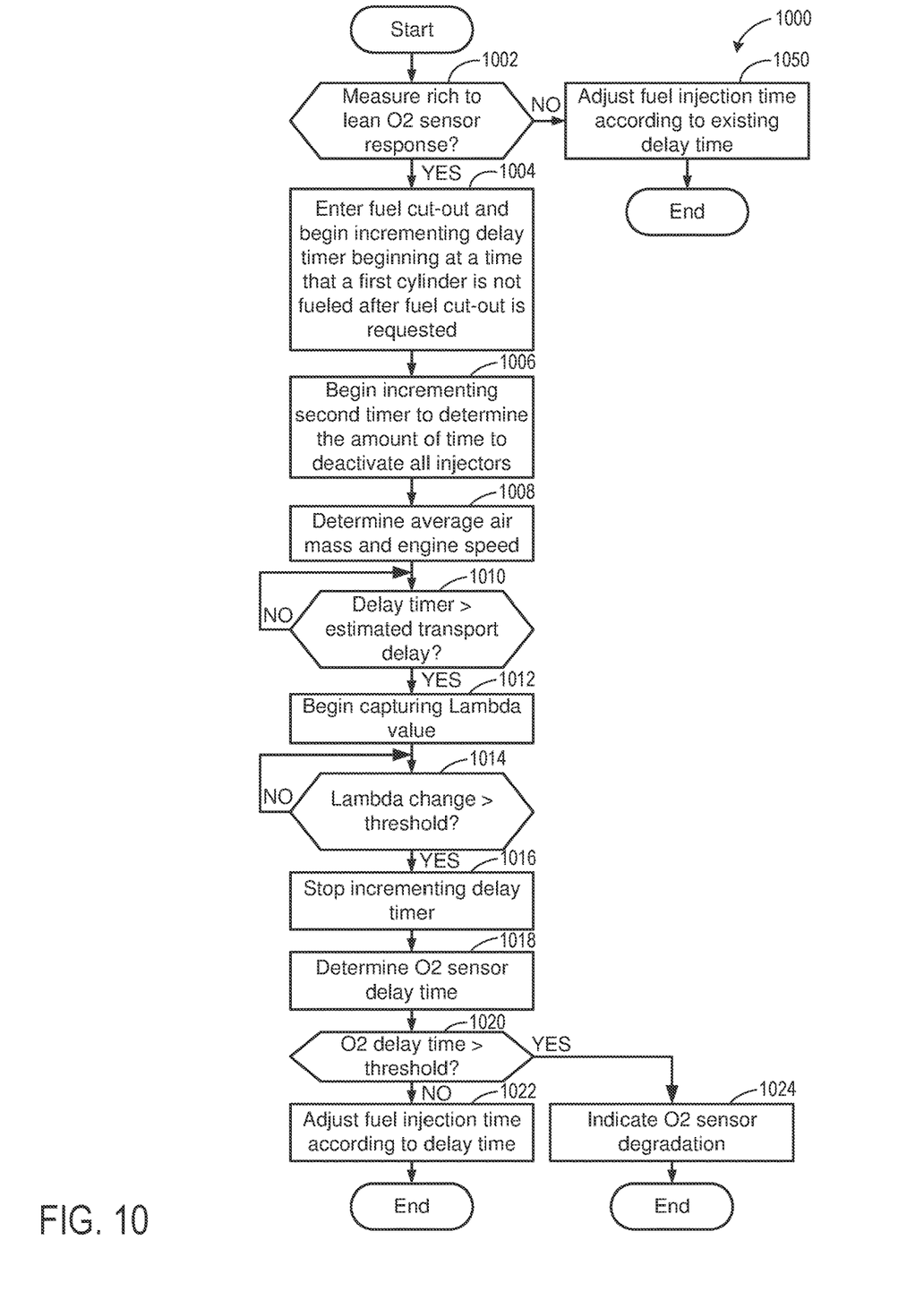
FIGS. 10 and 11 shown flowcharts of methods for estimating a time delay of an exhaust gas sensor.
Figure 11:
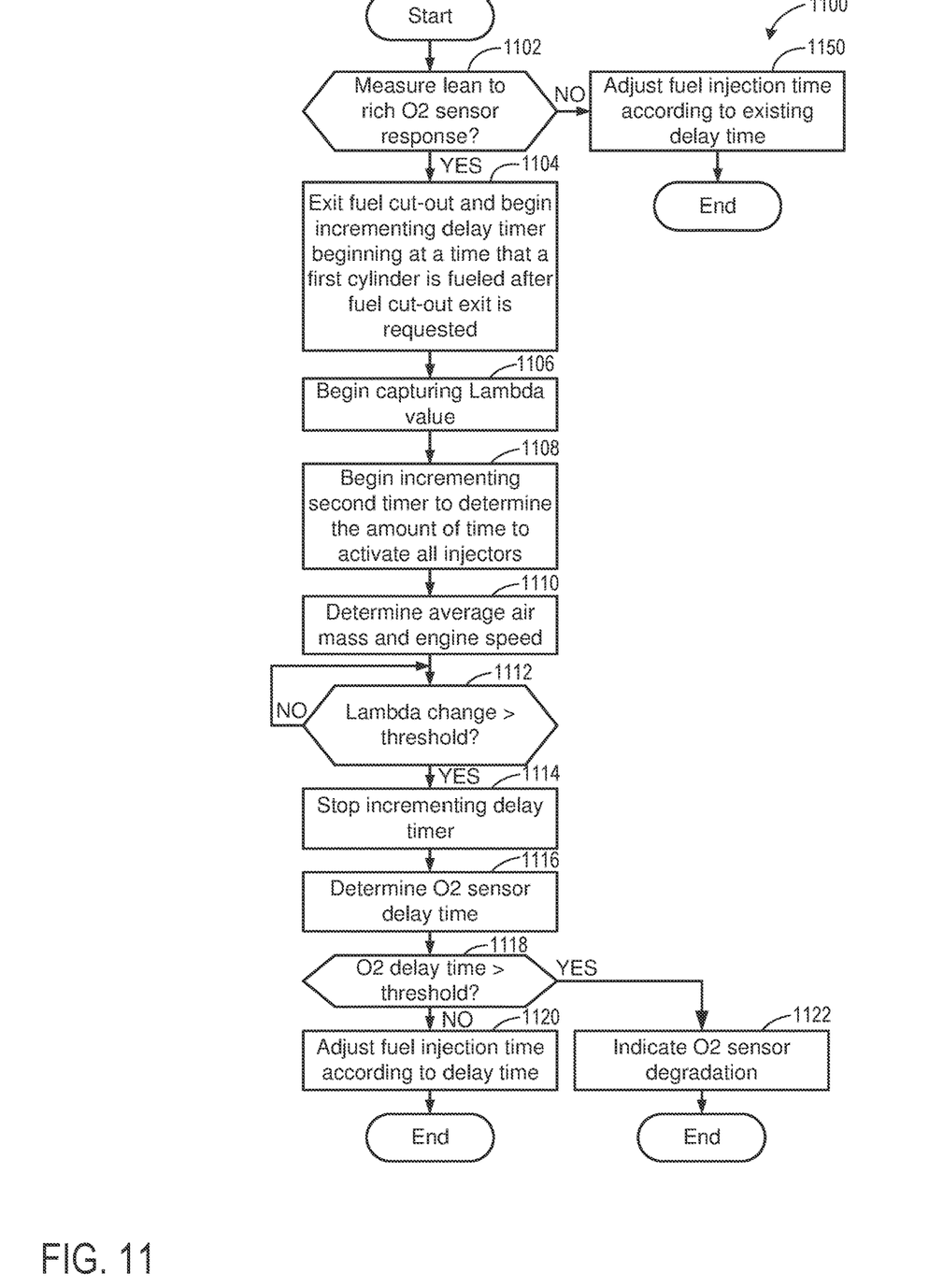

The following description relates to an approach for determining degradation of an exhaust gas sensor. The approach may be applied to an engine of the type that is shown in FIG. 1. Oxygen sensor signal attributes and characteristics are shown in FIGS. 2-7. Sequences illustrating how delay times of an oxygen sensor may be estimated for lean to rich and rich to lean air-fuel ratio transitions may be determined are shown in FIGS. 8 and 9. Flowcharts of methods for estimating delay times of oxygen sensors for lean to rich and rich to lean air-fuel ratio transitions are shown in FIGS. 10 and 11.

FIG. 1 is a schematic diagram showing one cylinder of multi-cylinder engine 10, which may be included in a propulsion system of a vehicle in which an exhaust gas sensor 126 may be utilized to determine an air-fuel ratio of exhaust gas produce by engine 10. The air-fuel ratio (along with other operating parameters) may be used for feedback control of engine 10 in various modes of operation. Engine 10 may be controlled at least partially by a control system including controller 12 and by input from a vehicle operator 132 via an input device 130. In this example, input device 130 is a driver demand pedal and position of the driver demand pedal may be sensed via a pedal position sensor 134. Combustion chamber (i.e., cylinder) 30 of engine 10 may include combustion chamber walls 32 with piston 36 positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system. Further, a starter motor may be coupled to crankshaft 40 via a flywheel to enable a starting operation of engine 10.

Combustion chamber 30 may receive intake air from intake manifold 44 via intake passage 42 and may exhaust combustion gases via exhaust passage 48. Intake manifold 44 and exhaust passage 48 can selectively communicate with combustion chamber 30 via respective intake valve 52 and exhaust valve 54. In some embodiments, combustion chamber 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, cylinder 30 may alternatively include an intake valve controlled via electric valve actuation and an exhaust valve controlled via cam actuation including CPS and/or VCT systems.

Fuel injector 66 is shown arranged in intake passage 44 in a configuration that provides what is known as port injection of fuel into the intake port upstream of combustion chamber 30. Fuel injector 66 may inject fuel in proportion to the pulse width of signal received from controller 12 via electronic driver 68. Fuel may be delivered to fuel injector 66 by a fuel system (not shown) including a fuel tank, a fuel pump, and a fuel rail. In some embodiments, combustion chamber 30 may alternatively or additionally include a fuel injector coupled directly to combustion chamber 30 for injecting fuel directly therein, in a manner known as direct injection.

Ignition system 88 can provide an ignition spark to combustion chamber 30 via spark plug 92 in response to spark advance signal from controller 12, under select operating modes. Though spark ignition components are shown, in some embodiments, combustion chamber 30 or one or more other combustion chambers of engine 10 may be operated in a compression ignition mode, with or without an ignition spark.

Exhaust gas sensor 126 is shown coupled to exhaust passage 48 of exhaust system 50 upstream of emission control device 70. Sensor 126 may be any suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. In some embodiments, exhaust gas sensor 126 may be a first one of a plurality of exhaust gas sensors positioned in the exhaust system. For example, additional exhaust gas sensors may be positioned downstream of emission control 70.

Emission control device 70 is shown arranged along exhaust passage 48 downstream of exhaust gas sensor 126. Device 70 may be a three way catalyst (TWC), NOx trap, various other emission control devices, or combinations thereof. In some embodiments, emission control device 70 may be a first one of a plurality of emission control devices positioned in the exhaust system. In some embodiments, during operation of engine 10, emission control device 70 may be periodically reset by operating at least one cylinder of the engine within a particular air/fuel ratio. Controller 12 is shown in FIG. 1 as a microcomputer, including microprocessor unit 102, input/output ports 104, an electronic storage medium for executable programs and calibration values shown as read only memory chip 106 in this particular example, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal from sensor 118 (or other type) coupled to crankshaft 40; throttle position from a throttle position sensor; and absolute manifold pressure signal from sensor 122. An engine speed signal may be generated by controller 12 from output of sensor 118. A manifold pressure signal from a manifold pressure sensor may be used to provide an indication of vacuum, or pressure, in the intake manifold. Note that various combinations of the above sensors may be used, such as a MAF sensor without a MAP sensor, or vice versa. During stoichiometric operation, the MAP sensor can give an indication of engine torque. Further, this sensor, along with the detected engine speed, can provide an estimate of charge (including air) inducted into the cylinder. In one example, sensor 118, which is also used as an engine speed sensor, may produce a predetermined number of equally spaced pulses every revolution of the crankshaft.

Furthermore, at least some of the above described signals may be used in the exhaust gas sensor degradation determination method described in further detail below. For example, the inverse of the engine speed may be used to determine delays associated with the injection—intake—compression—expansion— exhaust cycle. As another example, the inverse of the velocity (or the inverse of the MAF signal) may be used to determine a delay associated with travel of the exhaust gas from the exhaust valve 54 to exhaust gas sensor 126. The above described examples along with other use of engine sensor signals may be used to determine the time delay between a change in the commanded air-fuel ratio and the exhaust gas sensor response rate.

In some embodiments, exhaust gas sensor degradation determination may be performed in a dedicated controller 140. Dedicated controller 140 may include processing resources 142 to handle signal-processing associated with production, calibration, and validation of the degradation determination of exhaust gas sensor 126. In particular, a sample buffer (e.g., generating approximately 100 samples per second per engine bank) utilized to record the response rate of the exhaust gas sensor may be too large for the processing resources of a powertrain control module (PCM) of the vehicle. Accordingly, dedicated controller 140 may be operatively coupled with controller 12 to perform the exhaust gas sensor degradation determination. Note that dedicated controller 140 may receive engine parameter signals from controller 12 and may send engine control signals and degradation determination information among other communications to controller 12. Controller 12 and/or dedicated controller 140 may send and receive messages to human/machine interface 143 (e.g., a touch screen display, light, display panel, etc.).

Note storage medium read-only memory 106 and/or processing resources 142 can be programmed with computer readable data representing instructions executable by processor 102 and/or dedicated controller 140 for performing the methods described below as well as other variants.

Thus, the system of FIG. 1 provides for a system for a vehicle, comprising: an engine including a fuel injection system; an exhaust gas sensor coupled in an exhaust system of the engine; and a controller including instructions executable to: count a time period, the time period beginning when a first cylinder of the engine is not fueled in response to a request for the engine to enter a fuel cut-off mode while fuel injectors of remaining engine cylinders are active, the time period ending in response to a Lambda value generated from output of the exhaust gas sensor increases by a threshold Lambda amount after the request for the engine to enter the fuel cut-off mode; additional instructions to estimate a delay based on the time period; and additional instructions to indicate a presence or absence of degradation of the exhaust gas sensor in response to the delay estimate. In a first example, the system includes wherein the presence or absence of degradation of the exhaust gas sensor is provided via a human/machine interface. In a second example that may include the first example, the system includes wherein the delay estimate is further based on a nominal delay. In a third example that may include one or both of the first and second examples, the system includes wherein the nominal delay is based on an average engine air mass and an average engine speed. In a fourth example that may include one or more of the first through third examples, the system includes wherein the delay estimate is further based on an injection ramping time. In a fifth example that may include one or more of the first through fourth examples, the system includes wherein the injection ramping time is an amount of time measured during an oxygen sensor evaluation period beginning at latest time during the oxygen sensor evaluation period when all engine cylinder fuel injectors are activated to a time during the oxygen sensor evaluation period when all engine cylinder fuel injectors are not activated. In a sixth example that may include one or more of the first through fifth examples, the system includes wherein the delay is an oxygens sensor delay.

As discussed above, exhaust gas sensor degradation may be determined based on any one, or in some examples each, of six discrete behaviors indicated by delays in the response rate of air/fuel ratio readings generated by an exhaust gas sensor during rich-to-lean transitions and/or lean-to-rich transitions. FIGS. 2-7 each show a graph indicating one of the six discrete types of exhaust gas sensor degradation behaviors. The graphs plot air/fuel ratio (lambda) versus time (in seconds). In each graph, the dotted line indicates a commanded lambda signal that may be sent to engine components (e.g., fuel injectors, cylinder valves, throttle, spark plug, etc.) to generate an air/fuel ratio that progresses through a cycle comprising one or more lean-to-rich transitions and one or more rich-to-lean transitions. In each graph, the dashed line indicates an expected lambda response time of an exhaust gas sensor. In each graph, the solid line indicates a degraded lambda signal that would be produced by a degraded exhaust gas sensor in response to the commanded lambda signal. In each of the graphs, the double arrow lines indicate where the given degradation behavior type differs from the expected lambda signal.

Figures 2, 3, 4:
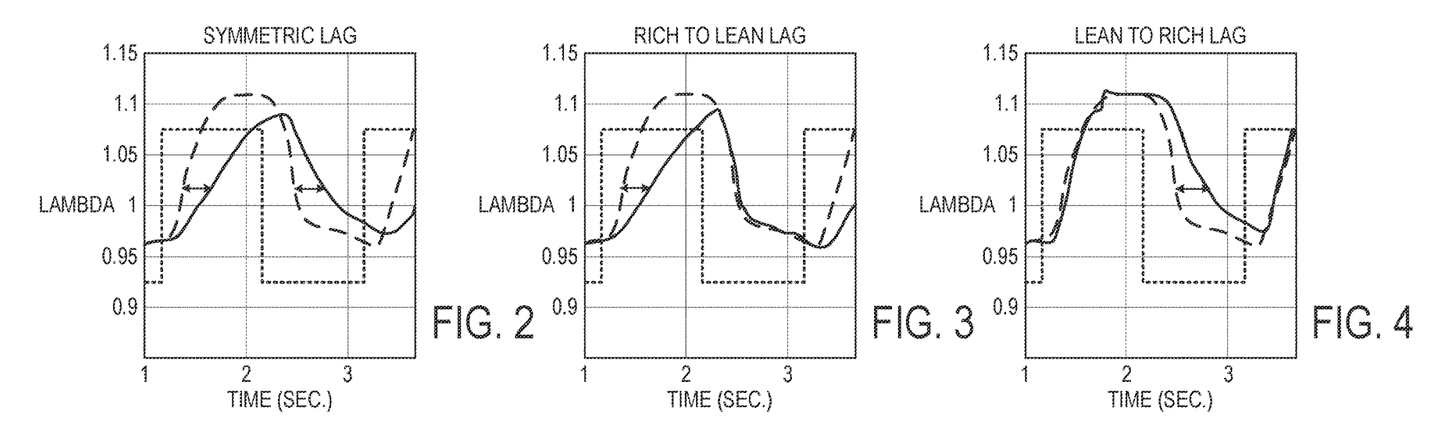
FIG. 2 shows a graph indicating a symmetric lag or slow response type degradation behavior of an exhaust gas sensor.
FIG. 3 shows a graph indicating an asymmetric rich-to-lean lag or slow response type degradation behavior of an exhaust gas sensor.
FIG. 4 shows a graph indicating an asymmetric lean-to-rich lag or slow response type degradation behavior of an exhaust gas sensor.

FIG. 2 shows a graph indicating a first type of degradation behavior that may be exhibited by a degraded exhaust gas sensor. This first type of degradation behavior is a symmetric slow response type that includes slow exhaust gas sensor response to the commanded lambda signal for both rich-to-lean and lean-to-rich modulation. In other words, the degraded lambda signal may start to transition from rich-to-lean and lean-to-rich at the expected times but the response rate may be lower than the expected response rate, which results in reduced lean and rich peak times.

FIG. 3 shows a graph indicating a second type of degradation behavior that may be exhibited by a degraded exhaust gas sensor. The second type of degradation behavior is an asymmetric rich-to-lean slow response type that includes slow exhaust gas sensor response to the commanded lambda signal for a transition from rich-to-lean air/fuel ratio. This behavior type may start the transition from rich-to-lean at the expected time but the response rate may be lower than the expected response rate, which may result in a reduced lean peak time. This type of behavior may be considered asymmetric because the response of the exhaust gas sensor is slow (or lower than expected) during the transition from rich-to-lean.

FIG. 4 shows a graph indicating a third type of degradation behavior that may be exhibited by a degraded exhaust gas sensor. The third type of behavior is an asymmetric lean-to-rich slow response type that includes slow exhaust gas sensor response to the commanded lambda signal for a transition from lean-to-rich air/fuel ratio. This behavior type may start the transition from lean-to-rich at the expected time but the response rate may be lower than the expected response rate, which may result in a reduced rich peak time. This type of behavior may be considered asymmetric because the response of the exhaust gas sensor is only slow (or lower than expected) during the transition from lean-to-rich.

Figures 5, 6, 7:
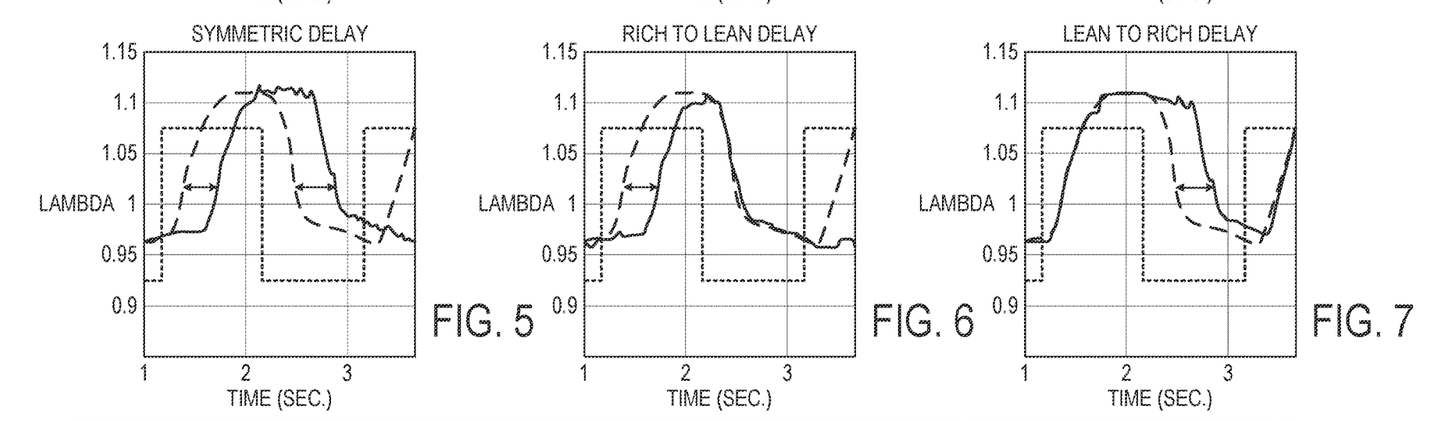
FIG. 5 show a graph indicating a symmetric delay type degradation behavior of an exhaust gas sensor.
FIG. 6 shows a graph indicating an asymmetric rich-to-lean delay type degradation behavior of an exhaust gas sensor.
FIG. 7 shows a graph indicating an asymmetric lean-to-rich delay type degradation behavior of an exhaust gas senor.

FIG. 5 shows a graph indicating a fourth type of degradation behavior that may be exhibited by a degraded exhaust gas sensor. This fourth type of degradation behavior is a symmetric delay type that includes a delayed response to the commanded lambda signal for both rich-to-lean and lean-to-rich modulation. In other words, the degraded lambda signal may start to transition from rich-to-lean and lean-to-rich at times that are delayed from the expected times, but the respective transition may occur at the expected response rate, which results in shifted lean and rich peak times.

FIG. 6 shows a graph indicating a fifth type of degradation behavior that may be exhibited by a degraded exhaust gas sensor. This fifth type of degradation behavior is an asymmetric rich-to-lean delay type that includes a delayed response to the commanded lambda signal from the rich-to-lean air/fuel ratio. In other words, the degraded lambda signal may start to transition from rich-to-lean at a time that is delayed from the expected time, but the transition may occur at the expected response rate, which results in shifted and/or reduced lean peak times. This type of behavior may be considered asymmetric because the response of the exhaust gas sensor is only delayed from the expected start time during a transition from rich-to-lean.

FIG. 7 shows a graph indicating a sixth type of degradation behavior that may be exhibited by a degraded exhaust gas sensor. This sixth type of behavior is an asymmetric lean-to-rich delay type that includes a delayed response to the commanded lambda signal from the lean-to-rich air/fuel ratio. In other words, the degraded lambda signal may start to transition from lean-to-rich at a time that is delayed from the expected time, but the transition may occur at the expected response rate, which results in shifted and/or reduced rich peak times. This type of behavior may be considered asymmetric because the response of the exhaust gas sensor is only delayed from the expected start time during a transition from lean-to-rich.

Referring now to FIG. 8, a first method for estimating a delay time of an oxygen sensor during richer to leaner air-fuel ratio transition is shown. The sequence shown in FIG. 8 may be provided via the system of FIG. 1 in cooperation with the method of FIG. 10.

The first plot from the top of FIG. 8 is a plot of a Lambda value as determined from output of an oxygen sensor versus time. The vertical axis represents Lambda and the Lambda value increases (e.g., indicates a leaner air-fuel ratio) in the direction of the vertical axis arrow. The horizontal axis represents time and time increases from the left side of the plot to the right side of the plot. Trace 802 represents a Lambda value sensed via an oxygen sensor in the engine's exhaust system.

The second plot from the top of FIG. 8 is a plot of a fuel cut-off request state versus time. The vertical axis represents the fuel cut-off request state and the fuel cut-off request is asserted when trace 804 is at a higher level that is near the vertical axis arrow. The fuel cut-off request is not asserted when trace 804 is at a lower level near the horizontal axis. The horizontal axis represents time and time increases from the left side of the plot to the right side of the plot. Trace 804 represents a fuel cut-off request state.

The third plot from the top of FIG. 8 is a plot of an oxygen sensor delay timer value versus time. The vertical axis represents the oxygen sensor delay timer value and the oxygen sensor time delay timer value increases in the direction of the vertical axis arrow. The horizontal axis represents time and time increases from the left side of the plot to the right side of the plot. Trace 806 represents an oxygen sensor delay timer value.

The fourth plot from the top of FIG. 8 is a plot of a fuel injection ramping timer value versus time. The vertical axis represents the fuel injection ramping timer value and the fuel injection ramping timer value increases in the direction of the vertical axis arrow. The horizontal axis represents time and time increases from the left side of the plot to the right side of the plot. Trace 808 represents the fuel injection ramping time estimate.

The fifth plot from the top of FIG. 8 is a plot of engine speed and engine speed increases in the direction of the vertical axis arrow. The horizontal axis represents time and time increases from the left side of the plot to the right side of the plot. Trace 810 represents engine speed.

The sixth plot from the top of FIG. 8 is a plot of engine air mass flow and engine air mass flow increases in the direction of the vertical axis arrow. The horizontal axis represents time and time increases from the left side of the plot to the right side of the plot. Trace 812 represents engine air mass flow.

At time t0, the engine is running and combusting air and fuel. The Lambda value is not changing and the fuel cut-off request has not been asserted. The oxygen sensor delay timer value is not being incremented and the fuel injection ramping timer is not being incremented. The engine speed is at a middle level and the engine air mass flow is at a middle level.

At time t1, driver demand torque (not shown) is reduced causing a corresponding reduction in the engine air mass flow. The engine speed begins to decline and the engine Lambda value is unchanged. The fuel cut-off is not requested and the oxygen sensor delay timer value is not incremented. The fuel injection ramping timer is not being incremented. The timer values are zero.

At time t2, fuel cut-out mode is requested as indicated by the fuel cut-off state. Fuel cut-out mode may be requested when driver demand is low and vehicle speed is greater than a threshold speed. The engine rotates without receiving fuel while the engine is operated in the fuel cut-off mode. The oxygen sensor delay timer value is not incrementing and the fuel injection ramp timer is not incrementing. The engine speed is slowly falling and the engine air flow rate is low. The Lambda value is at a richer level.

At time t3, fuel injection to a first engine cylinder is suspended, which causes the oxygen sensor delay timer to begin incrementing. The fuel injection ramping timer also begins incrementing to determine the amount of time it takes to deactivate all of the engine's fuel injectors. Some fuel injectors may be injecting fuel when the fuel cut-off is requested. The engine speed is slow falling and the engine air flow rate is low.

At time t4, fuel injection to the last cylinder that was being fueled is ceased. Therefore, the fuel injection ramp timer stops incrementing. The maximum value stored in the fuel injection timer is shown at time t4 and this value is the fuel injection ramp time. The fuel injection ramp time is stored in controller memory (RAM) and the fuel injection timer is cleared (e.g., set to zero) shortly thereafter. The engine speed continues to slowly decrease and the engine air mass flow is low. The oxygen sensor delay timer continues to increment.

At time t5, the Lambda value has changed by more than a threshold amount so the oxygen sensor delay timer stops incrementing. The maximum value stored in the oxygen sensor delay timer is the oxygen sensor delay timer value. The oxygen sensor delay timer value is stored in controller memory (RAM). The fuel injection ramping timer is cleared after the oxygen sensor delay timer value is stored in memory and the engine speed continues to decline. The engine air mass flow rate remains low.

In this way, an oxygen sensor delay timer value may be estimated. The oxygen sensor measured delay may be determined from the oxygen sensor delay timer value, the nominal delay (not shown), and the fuel injection ramping delay timer.

Referring now to FIG. 9, a first method for estimating an oxygen sensor delay time during leaner to richer air-fuel ratio transition is shown. The sequence shown in FIG. 9 may be provided via the system of FIG. 1 in cooperation with the method of FIG. 11.

The first plot from the top of FIG. 9 is a plot of a Lambda value as determined from output of an operational oxygen sensor versus time. The vertical axis represents Lambda and the Lambda value increases (e.g., indicates a leaner air-fuel ratio) in the direction of the vertical axis arrow. The horizontal axis represents time and time increases from the left side of the plot to the right side of the plot. Trace 902 represents a Lambda value sensed via an oxygen sensor in the engine's exhaust system.

The second plot from the top of FIG. 9 is a plot of a Lambda value as determined from output of a degraded oxygen sensor versus time. The vertical axis represents Lambda and the Lambda value increases (e.g., indicates a leaner air-fuel ratio) in the direction of the vertical axis arrow. The horizontal axis represents time and time increases from the left side of the plot to the right side of the plot. Trace 904 represents a Lambda value sensed via a degraded oxygen sensor in the engine's exhaust system.

The third plot from the top of FIG. 9 is a plot of a fuel cut-off request state versus time. The vertical axis represents the fuel cut-off request state and the fuel cut-off request is asserted when trace 906 is at a higher level that is near the vertical axis arrow. The fuel cut-off request is not asserted when trace 906 is at a lower level near the horizontal axis. The horizontal axis represents time and time increases from the left side of the plot to the right side of the plot. Trace 906 represents a fuel cut-off request state.

The fourth plot from the top of FIG. 9 is a plot of an oxygen sensor delay timer value versus time. The vertical axis represents the oxygen sensor delay timer value and the oxygen sensor time delay timer value increases in the direction of the vertical axis arrow. The horizontal axis represents time and time increases from the left side of the plot to the right side of the plot. Trace 908 represents an oxygen sensor delay timer value.

The fifth plot from the top of FIG. 9 is a plot of a fuel injection ramping timer value versus time. The vertical axis represents the fuel injection ramping timer value and the fuel injection ramping timer value increases in the direction of the vertical axis arrow. The horizontal axis represents time and time increases from the left side of the plot to the right side of the plot. Trace 910 represents the fuel injection ramping time estimate.

The sixth plot from the top of FIG. 9 is a plot of engine speed and engine speed increases in the direction of the vertical axis arrow. The horizontal axis represents time and time increases from the left side of the plot to the right side of the plot. Trace 912 represents engine speed.

The seventh plot from the top of FIG. 9 is a plot of engine air mass flow and engine air mass flow increases in the direction of the vertical axis arrow. The horizontal axis represents time and time increases from the left side of the plot to the right side of the plot. Trace 914 represents engine air mass flow.

At time t10, the engine is in fuel cut-off mode and not running (e.g., the engine is rotating without combusting air and fuel). The Lambda value is leaner and not changing. The fuel cut-off request is asserted. The oxygen sensor delay timer value is not being incremented and the fuel injection ramping timer is not being incremented. The engine speed is falling and the engine air mass flow is at a low level.

At time t11, the fuel cut-out mode request is withdrawn as indicated by the fuel cut-off state. A first cylinder begins receiving fuel (not shown) to the oxygen sensor delay timer value begins to be incremented and the fuel injection ramp timer also begins to be incremented. The engine speed continues falling and the engine air flow rate begins increasing. The Lambda values for the operational oxygen sensor and the degraded oxygen sensor are indicating a richer level. At time t12, fuel injection to all engine cylinders is active so the fuel injection ramp timer ceases incrementing and the value in the fuel injection ramp timer at time t12 is the fuel injection ramping time. The fuel injection ramping time is stored in the controller and then the ramping timer is cleared. The oxygen sensor delay timer continues incrementing and the engine speed begins to increase. The engine air mass flow continues to increase. The Lambda value of the operational Lambda sensor begins to decline shortly after time t12.

At time t13, the Lambda value for the degraded oxygen sensor is reduced by more than a threshold amount so the oxygen sensor delay timer ceases to be incremented at the value in the oxygen sensor delay timer at time t13 is stored to controller memory (e.g., RAM). The oxygen sensor delay timer is cleared after the oxygen sensor delay timer value is stored in controller memory. The oxygen sensor delay timer is based off the example degraded oxygen sensor Lambda value to show the relationship between the oxygen sensor Lambda value and delay timer operation. The fuel injection ramp timer is reduced to zero and the engine speed has increased after combustion in the engine is initiated. The engine air mass flow rate begins to level off.

In this way, an oxygen sensor delay timer value may be estimated during a leaner air-fuel ratio to richer air-fuel ratio change. The oxygen sensor measured delay may be determined from the oxygen sensor delay timer value, the nominal delay (not shown), and the fuel injection ramping delay timer.

Referring now to FIG. 10, a flowchart of a method to estimate a delay time of an oxygen sensor for a transition from a richer air-fuel ratio to a leaner air-fuel ratio is shown. Method 1000 may be carried out by a control system of a vehicle, such as controller 12 and/or dedicated controller 140, to monitor a sensor such as exhaust gas sensor 126. The method of FIG. 10 in cooperation with the system of FIG. 1 may generate the sequence of FIG. 8. Method 1000 may be entered when a vehicle that includes an engine is traveling on a road and the engine is rotating and combusting fuel.

At 1002, method 1000 judges whether or not a response of an oxygen sensor to a richer air-fuel mixture to a leaner air-fuel mixture is to be measured. Method 1000 may judge that the response of the oxygen sensor is to be measured at predetermined intervals, during opportunistic conditions, or in response to a specific request (e.g., as part of a service diagnostic). If method 1000 judges that the response of the oxygen sensor is to be measured, the answer is yes and method 1000 proceeds to 1004. Otherwise, the answer is no and method 1000 proceeds to 1050.

At 1050, method adjusts fuel injection timing in response to an oxygen sensor delay time. In one example, the fuel injection timing may be determined via an equation similar to the following equation: Inj_mass=f(Air_mass, Lambda, AF_s, O2_delay), where f is a function that returns a mass of fuel injected to a cylinder of the engine, Air_mass is an estimate of air mass in the cylinder, Lambda is air-fuel ratio (AF)/stoichiometric air-fuel ratio (AF_s), and O2_delay is the oxygen sensor delay time. Method 1000 proceeds to exit.

At 1004, method 1000 enters the engine into fuel cut-out mode where fuel injection to all engine cylinders is ceased. The fuel is injected to the engine according to a firing order of the engine and timing of each engine cylinders. For example, for a four cylinder engine with a firing order of 1-3-4-2, fuel may be injected for a cycle of the engine (e.g., two engine revolutions) to the cylinders at the following timings: for cylinder number one—during an intake stroke of cylinder number one; for cylinder number two—during an intake stroke of cylinder number two; for cylinder number three—during an intake stroke of cylinder number three; and for cylinder number four—during an intake stroke of cylinder number four. Thus, the fuel is injected to the engine cylinders sequentially according to the engine firing order.

Method 1000 may enter fuel cut-off mode in response to a request to enter fuel cut-off mode by sequentially suspending fuel injection (e.g., temporarily deactivating fuel injectors) to engine cylinders according to timing of the request to enter fuel cut-off mode and the cylinder for which fuel injection may be ceased earliest or soonest after the fuel cut-off request. For example, for a four cylinder engine with a firing order of 1-3-4-2, where cylinder number four is the first cylinder for which fuel injection may be ceased following the request to enter fuel cut-off mode, injection may be ceased to cylinder number four, followed by ceasing to flow fuel to cylinder number two, followed by ceasing fuel injection to cylinder number one, followed by ceasing fuel injection to cylinder number three. Method 1000 also begins counting or measuring an amount of time since fuel injection ceased to the first cylinder not to receive fuel following the fuel cut-off request. Thus, in the four cylinder example previously mentioned, if the fuel injection to cylinder number four would have begun at ten degrees after top-dead-center intake stroke for cylinder number four, a timer or counter (e.g., delay timer) begins to record an amount of time beginning at ten degrees after top-dead-center intake stroke for cylinder number four (e.g., the first cylinder to have fuel cut-off following the fuel cut-off mode request). In this way, the timer or counter begins counting time beginning at a time that start of injection would have otherwise started for the first cylinder to be cut-off from fuel after the fuel cut-off request. The amount of time that is captured or measured by the timer or counter may be referred to as the delay timer value. Method 1000 proceeds to 1006.

At 1006, method 1000 begins counting or measuring an amount of time since fuel injection ceased to the first cylinder not to receive fuel following the fuel cut-off request via a second timer or counter. Thus, like the delay timer, in the four cylinder example previously mentioned, if the fuel injection to cylinder number four would have begun at ten degrees after top-dead-center intake stroke for cylinder number four, a second timer or counter begins to record or count an amount of time beginning at ten degrees after top-dead-center intake stroke for cylinder number four (e.g., the first cylinder to have fuel cut-off following the fuel cut-off mode request). In this way, the second timer or counter begins counting time beginning at a time that start of injection would have otherwise started for the first cylinder to be cut-off from fuel after the fuel cut-off request.

The second timer ceases counting time when fuel flow to the last cylinder to have its fuel flow cut-off is ceased. Thus, for the four cylinder engine example previously mentioned, the second timer ceases counting or ceases accumulating an amount of time when the engine reaches ten degrees after top-dead-center intake stroke of cylinder number three (e.g., the beginning of injection time of the last cylinder for which fuel was cut-off in response to the fuel cut-off request). The amount of time that is captured or measured by the second timer or counter may be referred to as the injection ramping time value. Method 1000 proceeds to 1008.

At 1008, method 1000 determines average engine speed and the average mass air flow into the engine. The average engine speed may be a running average of a predetermined number of engine speed measurements. Likewise, the average engine air mass may be a running average of air mass values output from a mass air flow sensor. Method 1000 proceeds to 1010.

At 1010, method 1000 judges whether or not the delay timer value is greater than an estimated transport delay time. The estimated transport delay time may be estimated by XXX. If method 100 judges that the delay timer value is not greater than the estimated transport delay time, the answer is no and method 1000 returns to 1010. Otherwise, the answer is yes and method 1000 proceeds to 1012.

At 1012, method 1000 begins capturing engine Lambda values (e.g., equivalence ratio values, where Lambda=AF/AF_s, where AF is the engine air-fuel ratio and AF_s is the stoichiometric air-fuel ratio). The Lambda values may be determined from output of an oxygen sensor that is located in the engine exhaust system. Method 1000 proceeds to 1014.

At 1014, method 1000 judges whether or not the captured Lambda values have changed by more than a threshold Lambda amount (e.g., whether the Lambda value has increased by a threshold amount). If so, the answer is yes and method 1000 proceeds to 1016. Otherwise, the answer is no and method 1000 returns to 1014.

At 1016, method 1000 ceases incrementing the delay timer or ceases counting time with the delay timer. The delay timer value is stored in controller memory (e.g., RAM). Method 1000 proceeds to 1018.

At 1018, method 1000 determines the oxygen sensor delay time via the following equations:

$$O2 \text{ delay} = delaytmr - Nomdly - injcomp$$

$$Nomdly = C1 + \left(\frac{C2}{AvAM}\right) + \left(\frac{C3 \cdot 1000}{AveEng}\right)$$

$$injcomp = Injrmptm \cdot C4$$

where O2 delay is the time delay for the oxygen sensor, delaytmr is the delay timer value, Nomdly is the nominal delay estimate, injcomp is an injection ramping compensation value, C1 is an adjustable real number variable, C2 is an adjustable real number value, C3 is an adjustable real number value, AvAM is the average engine air mass flow, AveEng is the average engine speed, and C4 is an adjustable real number value. Method 1000 proceeds to 1020.

At 1020, method 1000 judges whether or not the oxygen sensor delay time is greater than a threshold delay time. The threshold delay time may be a largest delay time for which the oxygen sensor may be deemed to be operating as expected. If method 1000 judges that the oxygen sensor delay time is greater than a threshold delay time, the answer is yes and method 1000 proceeds to 1024. Otherwise, the answer is no and method 1000 proceeds to 1022.

At 1024, method provides an indication that an oxygen sensor may be degraded. In one example, method 1000 provides an indication of oxygen degradation via displaying a message at a human/machine interface. In addition, method 1000 may take mitigating actions such as operating engine with open loop fuel control where feedback from the degraded oxygen sensor is not used to control engine fuel injection. Thus, output of the degraded oxygen sensor may be ignored. Method 1000 proceeds to exit.

At 1022, method 1000 provides an indication that the oxygen sensor is not degraded. Method 1000 may not provide a message to a human/machine interface or method 1000 may send a message to the human/machine interface that the oxygen sensor is performing as expected. Additionally, method 1000 may adjust fuel injection according to the oxygen sensor time delay as described at 1050. Method 1000 proceeds to exit.

In this way, an accurate estimate of an oxygen sensor delay time may be determined so that an engine may be operated in an efficient way. Further, the method does not rely on complicated calibration procedures nor is it an intrusive method that may disturb engine operation.

Turning now to FIG. 11, a flowchart of a method to estimate a delay time of an oxygen sensor for a transition from a leaner air-fuel ratio to a richer air-fuel ratio is shown. Method 1000 may be carried out by a control system of a vehicle, such as controller 12 and/or dedicated controller 140, to monitor a sensor such as exhaust gas sensor 126. The method of FIG. 11 in cooperation with the system of FIG. 1 may generate the sequence of FIG. 9. Method 1100 may be entered when a vehicle that includes an engine is traveling on a road and the engine is rotating and combusting fuel.

At 1102, method 1100 judges whether or not a response of an oxygen sensor to a leaner air-fuel mixture to a richer air-fuel mixture is to be measured. Method 1100 may judge that the response of the oxygen sensor is to be measured at predetermined intervals, during opportunistic conditions, or in response to a specific request (e.g., as part of a service diagnostic). Method 1100 may require that the engine be operating in a fuel cut-off mode (e.g., where the engine is rotating and not combusting fuel in any of the engine's cylinders). If method 1100 judges that the response of the oxygen sensor is to be measured, the answer is yes and method 1100 proceeds to 1104. Otherwise, the answer is no and method 1100 proceeds to 1150.

At 1150, method adjusts fuel injection timing in response to an oxygen sensor delay time. In one example, the fuel injection timing may be determined via an equation similar to the following equation: Inj_mass=f(Air_mass, Lambda, AF_s, O2_delay), where f is a function that returns a mass of fuel injected to a cylinder of the engine, Air_mass is an estimate of air mass in the cylinder, Lambda is air-fuel ratio (AF)/stoichiometric air-fuel ratio (AF_s), and O2_delay is the oxygen sensor delay time. Method 1100 proceeds to exit.

At 1104, method 1100 exits the engine into fuel cut-out mode where fuel injection to all engine cylinders is ceased. The fuel is injected to the engine according to a firing order of the engine and timing of each engine cylinders. For example, for a four cylinder engine with a firing order of 1-3-4-2, fuel may be injected for a cycle of the engine (e.g., two engine revolutions) to the cylinders at the following timings: for cylinder number one—during an intake stroke of cylinder number one; for cylinder number two—during an intake stroke of cylinder number two; for cylinder number three—during an intake stroke of cylinder number three; and for cylinder number four—during an intake stroke of cylinder number four. Thus, the fuel is injected to the engine cylinders sequentially according to the engine firing order.

Method 1000 may exit fuel cut-off mode in response to a request to exit fuel cut-off mode by sequentially beginning fuel injection to engine cylinders according to timing of the request to exit fuel cut-off mode and the cylinder for which fuel injection may be commenced earliest or soonest after the fuel cut-off exit request. For example, for a four cylinder engine with a firing order of 1-3-4-2, where cylinder number four is the first cylinder for which fuel injection may be commenced following the request to exit fuel cut-off mode, injection may start to cylinder number four, followed by starting to flow fuel to cylinder number two, followed by starting fuel injection to cylinder number one, followed by starting fuel injection to cylinder number three. Method 1000 also begins counting or measuring an amount of time since fuel injection started to the first cylinder receiving fuel following the fuel cut-off request. Thus, in the four cylinder example previously mentioned, if the fuel injection to cylinder number four starts at ten degrees after top-dead-center intake stroke for cylinder number four, a timer or counter (e.g., delay timer) begins to record an amount of time beginning at ten degrees after top-dead-center intake stroke for cylinder number four (e.g., the first cylinder to have fuel injected following the exit fuel cut-off mode request). In this way, the timer or counter begins counting time beginning at a time that start of injection occurs for the first cylinder to exit cut-off mode after the exit fuel cut-off request. The amount of time that is captured or measured by the timer or counter may be referred to as the delay timer value. Method 1100 proceeds to 1106.

At 1106, method 1100 begins capturing to memory and monitoring engine Lambda values (e.g. measured air-fuel ratio/stoichiometric air-fuel ratio) as determined from output of an oxygen sensor. Method 1100 proceeds to 1108.

At 1108, method 1100 begins counting or measuring an amount of time since fuel injection started to the first cylinder to receive fuel following the exit fuel cut-off request via a second timer or counter. Thus, like the delay timer, in the four cylinder example mentioned at step 1104, if the fuel injection to cylinder number four begins at ten degrees after top-dead-center intake stroke for cylinder number four, a second timer or counter begins to record or count an amount of time beginning at ten degrees after top-dead-center intake stroke for cylinder number four (e.g., the first cylinder to exit fuel cut-off following the exit fuel cut-off mode request). In this way, the second timer or counter begins counting time beginning at a time that start of injection occurs after the exit fuel cut-off request.

The second timer ceases counting time when fuel flow to the last cylinder to have its fuel flow started begins for the first cycle of the last cylinder to be reactivated since exiting the fuel cut-off mode. Thus, for the four cylinder engine example previously mentioned, the second timer ceases counting or ceases accumulating an amount of time when the engine reaches ten degrees after top-dead-center intake stroke of cylinder number three (e.g., the beginning of injection time of the last cylinder for which fuel was cut-off in response to the fuel cut-off request). The amount of time that is captured or measured by the second timer or counter may be referred to as the injection ramping time value. Method 1100 proceeds to 1010.

At 1108, method 1100 determines average engine speed and the average mass air flow into the engine. The average engine speed may be a running average of a predetermined number of engine speed measurements. Likewise, the average engine air mass may be a running average of air mass values output from a mass air flow sensor. Method 1100 proceeds to 1110.

At 1112, method 1100 judges whether or not the captured Lambda values have changed by more than a threshold Lambda amount (e.g., whether the Lambda value has decreased by a threshold amount). If so, the answer is yes and method 1100 proceeds to 1214. Otherwise, the answer is no and method 1100 returns to 1112.

At 1114, method 1100 ceases incrementing the delay timer. The change in Lambda provides an indication that the delay in the oxygen sensor response is over. Method 1100 proceeds to 1116.

At 1116, method 1100 determines the oxygen sensor delay time via the equations mentioned at step 1018. Method 1100 proceeds to 1118.

At 1118, method 1100 judges whether or not the oxygen sensor delay time is greater than a threshold delay time. The threshold delay time may be a largest delay time for which the oxygen sensor may be deemed to be operating as expected. If method 1100 judges that the oxygen sensor delay time is greater than a threshold delay time, the answer is yes and method 1100 proceeds to 1122. Otherwise, the answer is no and method 1100 proceeds to 1020.

At 1022, method provides an indication that an oxygen sensor may be degraded. In one example, method 1100 provides an indication of oxygen degradation via displaying a message at a human/machine interface. In addition, method 1100 may take mitigating actions such as operating engine with open loop fuel control where feedback from the degraded oxygen sensor is not used to control engine fuel injection. Thus, output of the degraded oxygen sensor may be ignored. Method 1100 proceeds to exit.

At 1120, method 1100 provides an indication that the oxygen sensor is not degraded. Method 1100 may not provide a message to a human/machine interface or method 1100 may send a message to the human/machine interface that the oxygen sensor is performing as expected. Additionally, method 1100 may adjust fuel injection according to the oxygen sensor time delay as described at 1150. Method 1100 proceeds to exit.

Thus, the method of FIGS. 10 and 11 provide for a method of monitoring an exhaust gas sensor coupled in an engine exhaust, comprising: indicating exhaust gas sensor degradation via a controller according to a time delay estimate, the time delay estimate based on a delay timer value, a nominal time delay, and an injection ramping time. In a first example, the method further comprises adjusting fuel injector timing in response to the delay time estimate. In a second example that may include the first example, the method includes wherein the indication is provided to a human/machine interface. In a third example that may include one or both of the first and second examples, the method includes wherein the nominal delay is a function of an average engine air mass and an average engine speed during a lean to rich engine air-fuel ratio change. In a fourth example that may include one or more of the first through third examples, the method includes wherein the delay timer begins incrementing from a value of zero beginning at a time fuel injection begins to a first cylinder reactivated after a most recent fuel cut-off event. In a fifth example that may include one or more of the first through fourth examples, the method includes wherein the delay timer ceases incrementing in response to a reduction in a Lambda value that is greater than a threshold reduction value. In a sixth example that may include one or more of the first through fifth examples, the method includes wherein the injection ramping time is an amount of time measured during an oxygen sensor evaluation period beginning at latest time during the oxygen sensor evaluation period when all engine cylinder fuel injectors are not activated to a time during the oxygen sensor evaluation period when all engine cylinder fuel injectors are activated. In a seventh example that may include one or more of the first through sixth examples, the method includes where the oxygen sensor evaluation period is a time period during which an engine exits a fuel cut-off mode and activates all engine cylinders.

The methods of FIGS. 10 and 11 also provide for a method of monitoring an oxygen sensor coupled in an engine exhaust, comprising: counting a time period, the time period beginning when a first cylinder of the engine is fueled in response to a request for the engine to exit a fuel cut-off mode while fuel injectors of remaining engine cylinders are inactive, the time period ending in response to a Lambda value generated from output of the exhaust gas sensor decreases by a threshold Lambda amount after the request for the engine to exit the fuel cut-off mode; estimating an oxygen sensor delay time based on the time period; and indicating a presence or absence of oxygen sensor degradation in response the oxygen sensor delay time. In a first example, the method further comprises adjusting fuel injection in response to the oxygen sensor delay time. In a second example that may include the first example, the method includes wherein estimating the oxygen sensor delay time includes estimating the oxygen sensor delay time further based on a nominal delay time. In a third example that may include one or both of the first and second examples, the method includes wherein nominal delay time is based on an average engine air mass and average engine speed. In a fourth example that may include one or more of the first through third examples, the method includes wherein estimating the oxygen sensor delay time includes estimating the oxygen sensor delay time further based on an injection ramping time.

It will be appreciated that the configurations and methods disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method of monitoring an exhaust gas sensor coupled in an engine exhaust, comprising:
   indicating exhaust gas sensor degradation via a controller according to a time delay estimate, the time delay estimate based on a delay timer value, a nominal time delay, and an injection ramping time.

2. The method of claim 1, further comprising adjusting fuel injector timing in response to the time delay estimate.

3. The method of claim 1, wherein indicating exhaust gas sensor degradation includes displaying an indication to a human/machine interface.

4. The method of claim 1, wherein the nominal time delay is a function of an average engine air mass and an average engine speed during a lean to rich engine air-fuel ratio change.

5. The method of claim 4, wherein the delay timer value begins incrementing from a value of zero beginning at a time fuel injection begins to a first cylinder reactivated after a most recent fuel cut-off event.

6. The method of claim 5, wherein the delay timer value ceases incrementing in response to a reduction in a Lambda value that is greater than a threshold reduction value.

7. The method of claim 6, wherein the injection ramping time is an amount of time measured during an oxygen sensor evaluation period beginning at a latest time during the oxygen sensor evaluation period when all engine cylinder fuel injectors are not activated to a time during the oxygen sensor evaluation period when all engine cylinder fuel injectors are activated.

8. The method of claim 7, wherein the oxygen sensor evaluation period is a time period during which an engine exits a fuel cut-off mode and activates all engine cylinders.

9. A system for a vehicle, comprising:
an engine including a fuel injection system;
an exhaust gas sensor coupled in an exhaust system of the engine; and
a controller including instructions executable to:
count a time period, the time period beginning when a first cylinder of the engine is not fueled in response to a request for the engine to enter a fuel cut-off mode while fuel injectors of remaining engine cylinders are active, the time period ending in response to a Lambda value generated from output of the exhaust gas sensor increases by a threshold Lambda amount after the request for the engine to enter the fuel cut-off mode;
additional instructions to estimate a delay based on the time period; and
additional instructions to indicate a presence or absence of degradation of the exhaust gas sensor in response to the delay.

10. The system of claim 9, wherein the presence or absence of degradation of the exhaust gas sensor is provided via a human/machine interface.

11. The system of claim 9, wherein the delay is further based on a nominal delay.

12. The system of claim 11, wherein the nominal delay is based on an average engine air mass and an average engine speed.

13. The system of claim 9, wherein the delay is further based on an injection ramping time.

14. The system of claim 13, wherein the injection ramping time is an amount of time measured during an oxygen sensor evaluation period beginning at latest time during the oxygen sensor evaluation period when all engine cylinder fuel injectors are activated to a time during the oxygen sensor evaluation period when all engine cylinder fuel injectors are not activated.

15. The system of claim 9, wherein the delay is an oxygens sensor delay.

16. A method of monitoring an oxygen sensor coupled in an engine exhaust, comprising:
counting a time period, the time period beginning when a first cylinder of an engine is fueled in response to a request for the engine to exit a fuel cut-off mode while fuel injectors of remaining engine cylinders are inactive, the time period ending in response to a Lambda value generated from output of the oxygen sensor decreases by a threshold Lambda amount after the request for the engine to exit the fuel cut-off mode;
estimating an oxygen sensor delay time based on the time period; and
indicating a presence or absence of oxygen sensor degradation in response the oxygen sensor delay time.

17. The method of claim 16, further comprising adjusting fuel injection in response to the oxygen sensor delay time.

18. The method of claim 16, wherein estimating the oxygen sensor delay time includes estimating the oxygen sensor delay time further based on a nominal delay time.

19. The method of claim 18, wherein nominal delay time is based on an average engine air mass and average engine speed.

20. The method of claim 19, wherein estimating the oxygen sensor delay time includes estimating the oxygen sensor delay time further based on an injection ramping time.

\* \* \* \* \*